United States Patent
Wang et al.

(10) Patent No.: US 11,102,319 B2
(45) Date of Patent: Aug. 24, 2021

(54) METHOD, SYSTEM AND SERVER FOR STREAM-PUSHING

(71) Applicant: Wangsu Science & Technology Co., Ltd., Shanghai (CN)

(72) Inventors: Zhoufeng Wang, Shanghai (CN); Xiaochuan Zhuang, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 30 days.

(21) Appl. No.: 16/439,537

(22) Filed: Jun. 12, 2019

(65) Prior Publication Data
US 2020/0244753 A1 Jul. 30, 2020

Related U.S. Application Data

(63) Continuation of application No. PCT/CN2019/077230, filed on Mar. 6, 2019.

(30) Foreign Application Priority Data

Jan. 29, 2019 (CN) .......................... 201910088038.1

(51) Int. Cl.
*H04L 29/08* (2006.01)
*H04L 29/06* (2006.01)
*H04N 21/2187* (2011.01)

(52) U.S. Cl.
CPC .......... *H04L 67/26* (2013.01); *H04L 65/4084* (2013.01); *H04L 65/608* (2013.01); *H04L 65/80* (2013.01); *H04N 21/2187* (2013.01)

(58) Field of Classification Search
CPC ... H04L 67/26; H04L 65/4048; H04L 65/608; H04L 65/80; H04N 21/2187
(Continued)

(56) References Cited

U.S. PATENT DOCUMENTS

| 6,349,340 B1* | 2/2002 | Dyer | H04L 12/1859 |
| | | | 709/200 |
| 7,984,475 B1* | 7/2011 | Cope | H04N 21/64322 |
| | | | 725/120 |

(Continued)

FOREIGN PATENT DOCUMENTS

| CN | 105141660 A | 12/2015 |
| CN | 105681387 A | 6/2016 |

(Continued)

OTHER PUBLICATIONS

Hauswirth et al., A Component and Communication Model for Push Systems, 1999, European Software Engineering Conference ACM SIGSOFT Symposium on Foundations of Software Engineering, Section 3 A Component Model for Push Systems.*

(Continued)

*Primary Examiner* — Madhu Woolcock
(74) *Attorney, Agent, or Firm* — USCH Law, PC

(57) ABSTRACT

A method, a system and a server for stream-pushing are provided. In the stream-pushing method, a central node receives a stream-pushing request forward-pushed by an edge node, and determines whether the stream-pushing request corresponds to an existing channel. When a determination result is yes, the central node sends a prompt message to the edge node; or, when the determination result is no, the central node establishes one channel for the stream-pushing request and receives streaming media data corresponding to the channel. According to an example, internal flow consumption and server resource waste of a CDN can be avoided and the stream-pushing efficiency can be improved.

17 Claims, 8 Drawing Sheets

(58) Field of Classification Search
USPC .................................................. 709/223, 227
See application file for complete search history.

(56) References Cited

U.S. PATENT DOCUMENTS

| | | | | |
|---|---|---|---|---|
| 8,468,563 | B1* | 6/2013 | Sherwin | G06Q 30/0241 725/36 |
| 8,522,266 | B1* | 8/2013 | Kikinis | H04N 21/4882 725/32 |
| 8,533,755 | B1* | 9/2013 | Sherwin | H04N 21/23424 725/34 |
| 8,732,778 | B1* | 5/2014 | Shen | H04N 21/647 725/98 |
| 2002/0091762 | A1* | 7/2002 | Sohn | G06F 3/0481 709/203 |
| 2002/0133611 | A1* | 9/2002 | Gorsuch | H04L 65/4038 709/231 |
| 2002/0161767 | A1* | 10/2002 | Shapiro | G06F 16/958 |
| 2003/0002477 | A1* | 1/2003 | Israel | H04M 3/562 370/352 |
| 2003/0004880 | A1* | 1/2003 | Banerjee | G06F 16/958 705/51 |
| 2004/0028391 | A1* | 2/2004 | Black | H04N 7/181 386/223 |
| 2004/0143605 | A1* | 7/2004 | Jupin | G06F 16/951 |
| 2004/0267937 | A1* | 12/2004 | Klemets | H04L 29/06 709/227 |
| 2006/0176809 | A1* | 8/2006 | Lea | H04L 47/24 370/229 |
| 2007/0058083 | A1* | 3/2007 | Kim | H04N 21/482 348/725 |
| 2007/0260674 | A1* | 11/2007 | Shenfield | H04L 67/32 709/203 |
| 2008/0178248 | A1* | 7/2008 | Kim | H04N 21/434 725/134 |
| 2008/0209467 | A1* | 8/2008 | Song | H04N 21/23617 725/34 |
| 2008/0216143 | A1* | 9/2008 | Ikeda | H04N 21/2385 725/116 |
| 2009/0133073 | A1* | 5/2009 | DaLaCruz | H04N 21/482 725/49 |
| 2009/0164642 | A1* | 6/2009 | Foti | H04L 65/608 709/227 |
| 2010/0088734 | A1* | 4/2010 | Dewa | H04N 21/6581 725/93 |
| 2010/0299714 | A1* | 11/2010 | Ramasubramanian | H04N 21/6143 725/109 |
| 2011/0107376 | A1* | 5/2011 | Lee | H04N 5/50 725/56 |
| 2011/0142012 | A1* | 6/2011 | Jeon | H04L 47/826 370/336 |
| 2011/0188439 | A1* | 8/2011 | Mao | H04N 21/2365 370/312 |
| 2012/0072608 | A1* | 3/2012 | Peters | H04L 67/1008 709/231 |
| 2012/0096502 | A1* | 4/2012 | Yae | H04N 21/6125 725/108 |
| 2013/0144979 | A1* | 6/2013 | Kansal | H04N 21/23106 709/219 |
| 2014/0075515 | A1* | 3/2014 | McColgan | H04W 12/069 726/4 |
| 2014/0165089 | A1* | 6/2014 | Park | H04N 21/8352 725/25 |
| 2015/0074266 | A1* | 3/2015 | Alisawi | H04W 80/12 709/224 |
| 2016/0088484 | A1* | 3/2016 | Yang | H04W 16/14 370/252 |
| 2016/0182600 | A1 | 6/2016 | Swaminathan et al. | |
| 2017/0006611 | A1* | 1/2017 | Van Phan | H04W 72/042 |
| 2017/0171581 | A1* | 6/2017 | Mulligan | H04N 21/64322 |

FOREIGN PATENT DOCUMENTS

| | | |
|---|---|---|
| CN | 106803974 A | 6/2017 |
| CN | 106850581 A | 6/2017 |
| CN | 108012159 A | 5/2018 |
| CN | 108055264 A | 5/2018 |
| CN | 108574685 A | 9/2018 |
| CN | 105721484 B | 1/2019 |
| WO | 2014201177 A1 | 12/2014 |
| WO | 2018166415 A1 | 9/2018 |

OTHER PUBLICATIONS

Kinoshita et al., The RealPush Network: A new push-type content delivery system using reliable multicasting, Nov. 1998, Nippon Telegraph and Telephone Corp., Information and Communication Labs., pp. 2-6.*
Chinese First Office Action dated Mar. 16, 2020, Patent Application No. 201910088038.1, 8 pages.
Extended European Search Report dated May 25, 2020, Patent Application No. 19725834.6, 7 pages.
International Search Report and Written Opinion dated Oct. 24, 2019, Patent Application No. PCT/CN2019/077230, 9 pages.
"Prevent NetStream.Publish.BadName Errors," Web Page, Adobe, published Jul. 5, 2012, 1 pg.

* cited by examiner

METHOD, SYSTEM AND SERVER FOR STREAM-PUSHING

CROSS-REFERENCE TO RELATED APPLICATIONS

The present application is a continuation of International Application No. PCT/CN2019/077230, filed on Mar. 6, 2019, which claims benefit of Chinese Application No. 201910088038.1 filed Jan. 29, 2019, the contents of which are incorporated herein by reference in its entirety.

TECHNICAL FIELD

The present disclosure relates to the field of internet technology, and in particular, to a method, a system and a server for stream-pushing.

BACKGROUND

Along with rapid development of internet, many internet live-broadcasting platforms and mobile phone live-broadcasting APPs emerge and network live broadcast technology is also continuously improved.

Live broadcast technology adopted in a streaming media server at present mainly includes the following: an anchor may push streaming media data to an edge node in a Content Delivery Network (CDN) by a stream pusher, the edge node may forward the received streaming media data to a central node in the CDN, the central node may establish a channel for the streaming media data after receiving the streaming media data, and a user client may obtain desired streaming media data from the channel established by the CDN in a manner of stream pull and then play the streaming media.

During pushing streaming media data, the stream pusher usually pushes streaming media data based on a Real Time Messaging Protocol (RTMP). In the RTMP, the format of Uniform Resource Locator (URL) generally is rtmp://serveraddr:port/appName/appInstance, where rtmp are initials of Real Time Messaging Protocol, serveraddr usually is a domain name or an Internet Protocol address (IP) of a streaming media server, port generally uses 1935, appName usually refers to an advertising point or a name of an application that uses streaming media service and appInstance refers to a stream name or a name of a streaming media application instance. It can be seen that a URL adopting the RTMP may uniquely identify one channel of a streaming media server, one stream pusher may provide streaming media data for one channel by use of the URL of the RTMP and a playback terminal may access the channel corresponding to the URL by using the URL of the RTMP to obtain the streaming media data.

Since there are a plurality of central nodes and a plurality of edge nodes in the CDN, when the streaming media data of the same URL is pushed to a plurality of edge nodes at the same time, the plurality of edge nodes may forward-push the data to the central node respectively, and the central node may establish one channel for the pushed stream of an edge node accessing firstly and deny a stream-pushing request of an edge node accessing subsequently. The edge nodes which have been denied may continuously attempt to push streaming media data to the central node after being denied, which results in internal flow consumption and server resource wastes in the CDN. Thus, at present, a stream-pushing method which avoids wasting server resource is urgently needed.

SUMMARY

Embodiments of the present disclosure is intended to provide a method, a system and a server for stream-pushing to avoid internal flow consumption and server resource waste in a CDN and to improve a resource utilization rate of a stream-pushing server.

An embodiment of the present disclosure provides a stream-pushing method. A central node receives a stream-pushing request forward-pushed by an edge node, and determines whether the stream-pushing request corresponds to an existing channel. When a determination result is yes, the central node sends a prompt message to the edge node. Or when the determination result is no, the central node establishes one channel for the stream-pushing request and receives streaming media data corresponding to the channel.

An embodiment of the present disclosure further provides a stream-pushing method. An edge node receives a stream-pushing request sent by a stream pusher, where a number of the edge nodes may be one or more. The edge node determines a target central node according to the stream-pushing request so that the stream-pushing requests in one or more edge nodes correspond to the same target central node; and the edge node forward-pushes the stream-pushing request to the target central node.

An embodiment of the present disclosure further provides a stream-pushing system. The system includes at least one central node server and at least one edge node server. The edge node server is configured to receive a stream-pushing request sent by a stream pusher and determine a target central node server based on the stream-pushing request and forward-push the stream-pushing request to the target central node server. The target central node server is included in the at least one central node server and is configured to receive the stream-pushing request sent by the edge node server, and determine whether the stream-pushing request corresponds to an existing channel. When a determination result is yes, the target central node server is further configured to send a prompt message to the edge node server; or, when the determination result is no, the target central node server is further configured to establish one channel for the stream-pushing request and receive the streaming media data corresponding to the channel.

An embodiment of the present disclosure further provides a stream-pushing server. The stream-pushing server may be a central node server which includes: a stream-pushing receiving unit configured to receive a stream-pushing request forward-pushed by an edge node, a determining unit configured to determine whether the stream-pushing request corresponds to an existing channel, and a feeding-back or receiving unit configured to send a prompt message to the edge node when the determination result is yes, or to establish one channel for the stream-pushing request and receive streaming media data corresponding to the channel when the determination result is no.

An embodiment of the present disclosure also provides a stream-pushing server. The stream-pushing server may be an edge node server which includes: a receiving unit configured to receive a stream-pushing request sent by a stream pusher, a target central node determining unit configured to determine a target central node based on the stream-pushing request so that one stream-pushing request corresponds to the same target central node, and a forward-pushing unit configured to forward-push the stream-pushing request to the target central node.

An embodiment of the present disclosure also provides a management server, including a memory and a processor.

The memory stores computer programs and the computer programs are executed by the processor to perform the method executed by the central node or the edge node as described above.

It can be seen from the above, whether a stream-pushing request corresponds to an existing channel is determined by determining whether the channel names are consistent in embodiments of the present disclosure. When a corresponding channel exists, the stream-pushing request corresponding to the channel may not be received any more by feeding back a prompt message, thereby avoiding internal flow consumption and server resource wastes in a CDN. At the same time, it is guaranteed that the central nodes corresponding to the same channel names are consistent by determining the target central node to which forward-push is performed by the edge node based on a hash algorithm and the channel name. The same channel name may also be forward-pushed to the same central node through different edge nodes, thereby ensuring the uniqueness of one channel in an entire network. Thus, according to the technical solution provided by the present disclosure, the internal flow consumption and server resource wastes in a CDN may be avoided and the efficiency of stream-pushing may also be improved.

BRIEF DESCRIPTION OF DRAWINGS

One or more embodiments will be illustrated with pictures in the corresponding drawings, which will not constitute any limitation to any embodiment of the present disclosure.

DETAILED DESCRIPTION

To make the objective, technical solutions and advantages of the present disclosure clearer and more understandable, some embodiments of the present disclosure will be further described in detail in combination with accompanying drawings and examples.

Figure 1:
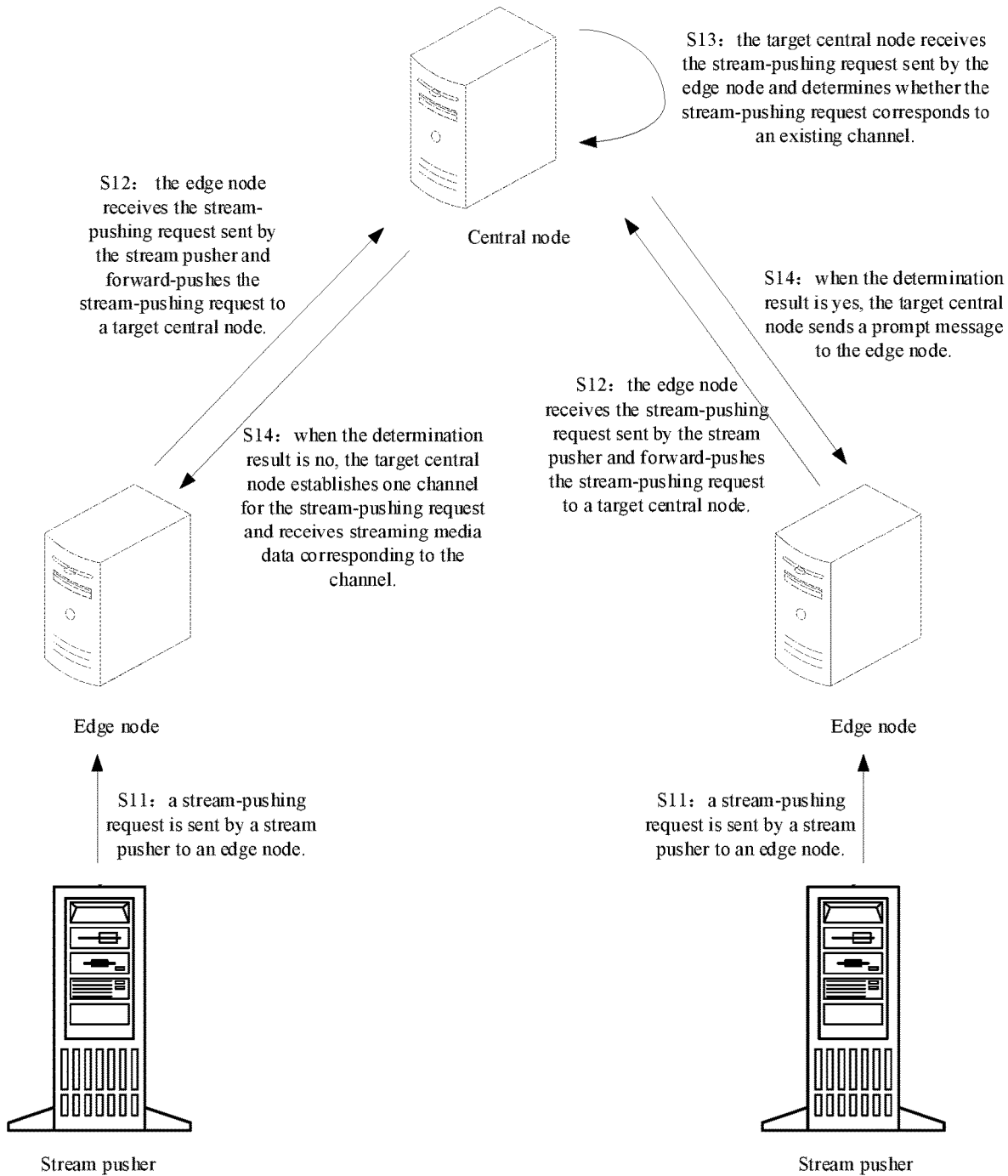
FIG. 1 is a flowchart illustrating a stream-pushing method using a CDN according to an embodiment of the present disclosure.

An embodiment of the present disclosure provides a stream-pushing method and the method may be applied to a live broadcast service using a CDN. As shown in FIG. 1, the CDN may include a central node and an edge node. The central node may establish communication with the edge node to perform data interaction with the edge node. One central node may establish communication with a plurality of edge nodes. The CDN may include a plurality of central nodes (only one central node shown in FIG. 1). The central node or the edge node may serve as a server. As shown in FIG. 1, the stream-pushing method in the present disclosure may include the following steps.

At step S11, a stream-pushing request is sent by a stream pusher to an edge node.

In an example, the stream-pushing request sent by the stream pusher may be transmitted based on a RTMP. A URL of a stream-pushing request using the RTMP may include an advertising point (i.e. appName) and a stream name (i.e. appInstance).

In an example, the stream pusher may send the stream-pushing request to an edge node, and one stream pusher may send the stream-pushing request to one or more edge nodes.

At step S12, the edge node receives the stream-pushing request sent by the stream pusher and forward-pushes the stream-pushing request to a target central node.

In an example, when the stream-pushing requests received by a plurality of edge nodes from the stream pusher are same, the plurality of edge nodes may forward-push the received stream-pushing requests to a central node of a CDN respectively.

In an example, the edge node forward-pushing the stream-pushing request to the target central node, specifically includes: determining a channel name corresponding to the stream-pushing request based on the stream-pushing request, determining the target central node based on the channel name and the IPs of all central nodes, and sending the stream-pushing request to the target central node.

In an example, the channel may have its corresponding channel name. The channel name may be used to uniquely identify the channel. Specifically, the channel name may include an advertising point and a stream name.

In an example, determining the target central node based on the channel name and the IPs of all central nodes includes: determining the IP of the target central node from the IPs of all central nodes by using the channel name as a key value on which a hash operation is performed. The number of the target central nodes may be preset. By the above method for determining the target central node, it is guaranteed that central nodes corresponding to the same channel name are consistent and the same channel name may also be forward-pushed to the same central node through different edge nodes, thereby ensuring the uniqueness of one channel in an entire network. At the same time, load balance of CDN may be achieved by hash operation.

At step S13, the target central node receives the stream-pushing request sent by the edge node and determines whether the stream-pushing request corresponds to an existing channel.

After receiving the stream-pushing request from the edge node, the target central node may determine whether the stream-pushing request corresponds to an existing channel, that is, determine whether the current stream-pushing request is a repeated stream-pushing request.

In an example, determining whether a channel corresponding to the stream-pushing request is an existing channel specifically includes: comparing the channel corresponding to the stream-pushing request with all existing channels of the target central node. When a same channel exists, a determination result is yes, and when no same channel exists, the determination result is no.

At step S14, when the determination result is yes, the target central node sends a prompt message to the edge node; or, when the determination result is no, the target central node establishes one channel for the stream-pushing request and receives streaming media data corresponding to the channel.

In an example, when the determination result of determining whether the stream-pushing request corresponds to an existing channel is yes, the target central node may send a prompt message to the edge node. That is, when the determination result of determining whether the stream-pushing request corresponds to an existing channel is yes, it indicates that the target central node already receives the same stream-pushing request from another edge node and the currently-received stream-pushing request is a repeated stream-pushing request. Thus, the target central node may send a prompt message to the edge node.

In an example, the prompt message may be a state code. The state code may be used to indicate an error type occurring to the current stream-pushing. Specifically, the state code may be a phrase "Origin Exist" and the state code may indicate that the error type occurring to the current stream-pushing is a repeated stream pushing.

In an example, when the determination result of determining whether the stream-pushing request corresponds to an existing channel is no, the target central node may establish one channel for the stream-pushing request and receive streaming media data corresponding to the channel.

In an example, the target central node may also store the received streaming media data which corresponds to the established channel.

In an example, the streaming media data may include audio data and/or video data.

In another example, the stream-pushing method may further include that: after receiving the prompt message from the central node, the edge node may send failure information of stream-pushing to the stream pusher.

The failure information of stream-pushing may be same as the prompt message and may also be different from the prompt message. For example, the failure information of stream-pushing may adopt the state code "Origin Exist" of the prompt message and may also adopt a custom message "failure request."

In an example, the stream-pushing method may further include that: the edge node disconnects with the stream pusher.

In an example, the stream-pushing method may also include: denying receiving the stream-pushing request corresponding to the channel based on a push prohibiting parameter. The push prohibiting parameter may be used to dispose the edge node so that the edge node is prohibited to receive the stream-pushing request corresponding to the channel within a particular period.

The push prohibiting parameter may include a push prohibiting channel name and a push prohibiting time. The push prohibiting parameter may be preset.

In another example, the stream-pushing request received by the target central node may further include priority information. Specifically, the priority information may be indicated by a parameter, for example, Pri, in a URL of a stream-pushing request using RTMP. For example, the URL containing the priority information may be "rtmp://serveraddr:port/appName/appInstance?wsPri=m", where the priority information is m.

In an example, the priority information may be indicated by one character. For example, the priority information may be indicated by one digit of 1, 2 or 3, or by one letter of m, n and so on. The priority level may be determined based on a preset sequence of the characters. For example, if the preset sequence of characters is m, n, p and q, the priority level of the stream-pushing request with the priority information of m should be higher than that of the stream-pushing request with priority information of p.

In an example, the value of the priority information may be generated based on the improved snowflake algorithm.

In this example, when the determination result of determining whether the stream-pushing request corresponds to an existing channel is no, the target central node may establish a channel for the stream-pushing request and receive streaming media data corresponding to the channel. Further, the target central node may also store priority information corresponding to the established channel.

Alternatively, in this example, when the determination result of determining whether the stream-pushing request corresponds to an existing channel is yes, the priority information of the stream-pushing request is compared with the priority information of the existing channel. The target central node may receive streaming media data with higher priority information based on a comparison result and store the priority information corresponding to the streaming media data.

In an example, when the priority level of the stream-pushing request is lower than that of the existing channel, the central node may further send a prompt message indicating a lower priority to the edge node. The prompt message indicating a lower priority may be a state code. The state code may be used to indicate an error type occurring to the current stream pushing. Specifically, the state code indicating a lower priority may be a phrase "Priority Low" and the state code may indicate that the error type occurring to the current stream-pushing is that the priority level of the current stream-pushing is lower than the priority level of the original channel.

For example, the priority information of one channel is 1. When voice stream data are added into the channel during a live broadcast or the channel is switched to a new live broadcast scenario, higher priority information 2 may be applied to the new streaming media data. Then, the new streaming media information may be pushed to the original channel again by use of the same stream name and stream data of the original channel may be updated and overwritten, thereby ensuring fast replacement and smooth connection of contents in one channel.

Figure 2:
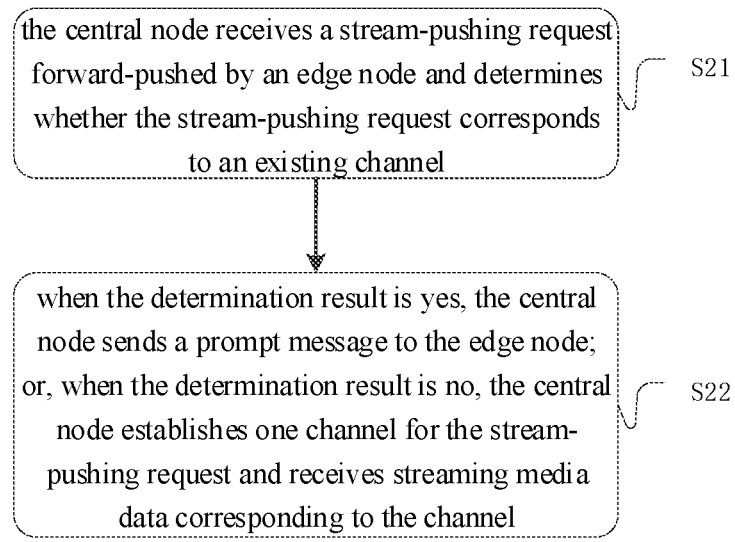
FIG. 2 is a flowchart illustrating a stream-pushing method implemented by a central node according to an embodiment of the present disclosure.

An embodiment of the present disclosure further provides a stream-pushing method. An execution subject of the stream-pushing method is a central node. As shown in FIG. 2, the stream-pushing method with a central node as a subject may include the following steps.

At step S21, the central node receives a stream-pushing request forward-pushed by an edge node and determines whether the stream-pushing request corresponds to an existing channel.

In an example, the stream-pushing request may be transmitted based on RTMP. The URL of the stream-pushing request using the RTMP may include an advertising point (i.e. appName) and a stream name (i.e. appInstance).

In an example, one channel may have its corresponding channel name. The channel name may be used to uniquely identify the channel. The channel name may include an advertising point and a stream name, that is, appName and appInstance in the corresponding URL of the streaming media data.

In an example, determining whether a channel corresponding to the stream-pushing request is an existing channel specifically includes: comparing the channel name corresponding to the stream-pushing request with the channel names of all existing channels of the central node. When a same channel exists, the determination result is yes, and when no same channel exists, the determination result is no.

At step S22, when the determination result is yes, the central node sends a prompt message to the edge node; or, when the determination result is no, the central node establishes one channel for the stream-pushing request and receives streaming media data corresponding to the channel.

In an example, the prompt message may be a state code. The state code may be used to indicate an error type occurring to the current stream pushing. Specifically, the state code may be a phrase "Origin Exist" and the state code may indicate that the error type occurring to the current stream-pushing is a repeated stream pushing.

In an example, the central node may further store the received streaming media data which corresponds to the established channel.

In an example, the streaming media data may include audio data and/or video data.

In another example, the stream-pushing request received by the central node may further include priority information. The priority information may be a character. For example, the priority information may be one digit of 1, 2 or 3 or one letter of m, n and so on. The priority level may be determined based on a preset sequence of the characters. For example, if the preset sequence of characters is m, n, p and q, the priority level of the stream-pushing request with the priority information of m should be higher than that of the stream-pushing request with priority information of p.

In this example, when the determination result of determining whether the stream-pushing request corresponds to an existing channel is no, the central node may establish one channel for the stream-pushing request and receive streaming media data corresponding to the channel. Further, the central node may also store priority information corresponding to the established channel.

Alternatively, in this example, when the determination result of determining whether the stream-pushing request corresponds to an existing channel is yes, the priority information of the stream-pushing request is compared with the priority information of the existing channel. The central node may receive streaming media data with higher priority information based on a comparison result and store the priority information corresponding to the streaming media data.

Figure 3:
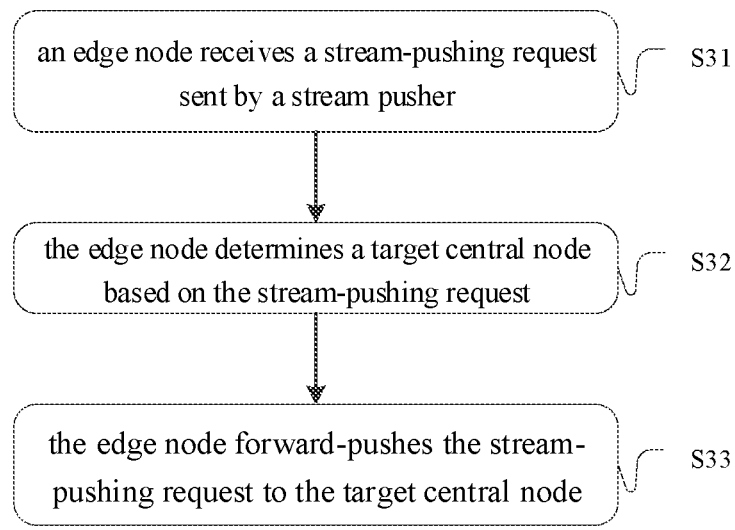
FIG. 3 is a flowchart illustrating a stream-pushing method of implemented by an edge node according to an embodiment of the present disclosure.

An embodiment of the present disclosure further provides a stream-pushing method. An execution subject of the stream-pushing method is an edge node. As shown in FIG. 3, the stream-pushing method with an edge node as a subject may include the following steps.

At step S31, an edge node receives a stream-pushing request sent by a stream pusher.

In an example, the stream-pushing request may be transmitted based on RTMP. The URL of the stream-pushing request using the RTMP may include an advertising point (i.e. appName) and a stream name (i.e. appInstance).

The channel may have its corresponding channel name. The channel name may be used to uniquely identify the channel. The channel name may include an advertising point and a stream name.

The number of the edge nodes may be one or more.

At step S32, the edge node determines a target central node based on the stream-pushing request.

The target central node may be determined based on the stream-pushing request so that the same stream-pushing requests in one or more edge nodes correspond to the same target central node. Thus, any edge node in the CDN may forward-push the stream-pushing request to the target central node corresponding to the stream-pushing request when performing forward-pushing on the same stream-pushing request.

In an example, the edge node determining the target central node based on the stream-pushing request, specifically includes: determining the IP of the target central node from the IPs of all central nodes by using the channel name as a key value on which a hash operation is performed. The number of the target central nodes may be preset.

At step S33, the edge node forward-pushes the stream-pushing request to the target central node.

In an example, when the target central node determines that the stream-pushing request corresponds to an existing channel, the method may further include that: the edge node receives a prompt message sent by the target central node.

Further, the stream-pushing method may include that: the edge node sends failure information of stream-pushing to the stream pusher.

The failure information of stream-pushing may be same as the prompt message and may also be different from the prompt message.

Further, the stream-pushing method may include that: the edge node disconnects with the stream pusher.

In an example, the stream-pushing method may further include denying receiving the stream-pushing request corresponding to the channel based on a push prohibiting parameter. The push prohibiting parameter may be used to dispose the edge node so that the edge node is prohibited to receive the stream-pushing request corresponding to the channel in a particular period.

The push prohibiting parameter may include: a push prohibiting channel name and a push prohibiting time. The push prohibiting parameter may be preset.

Figure 4:
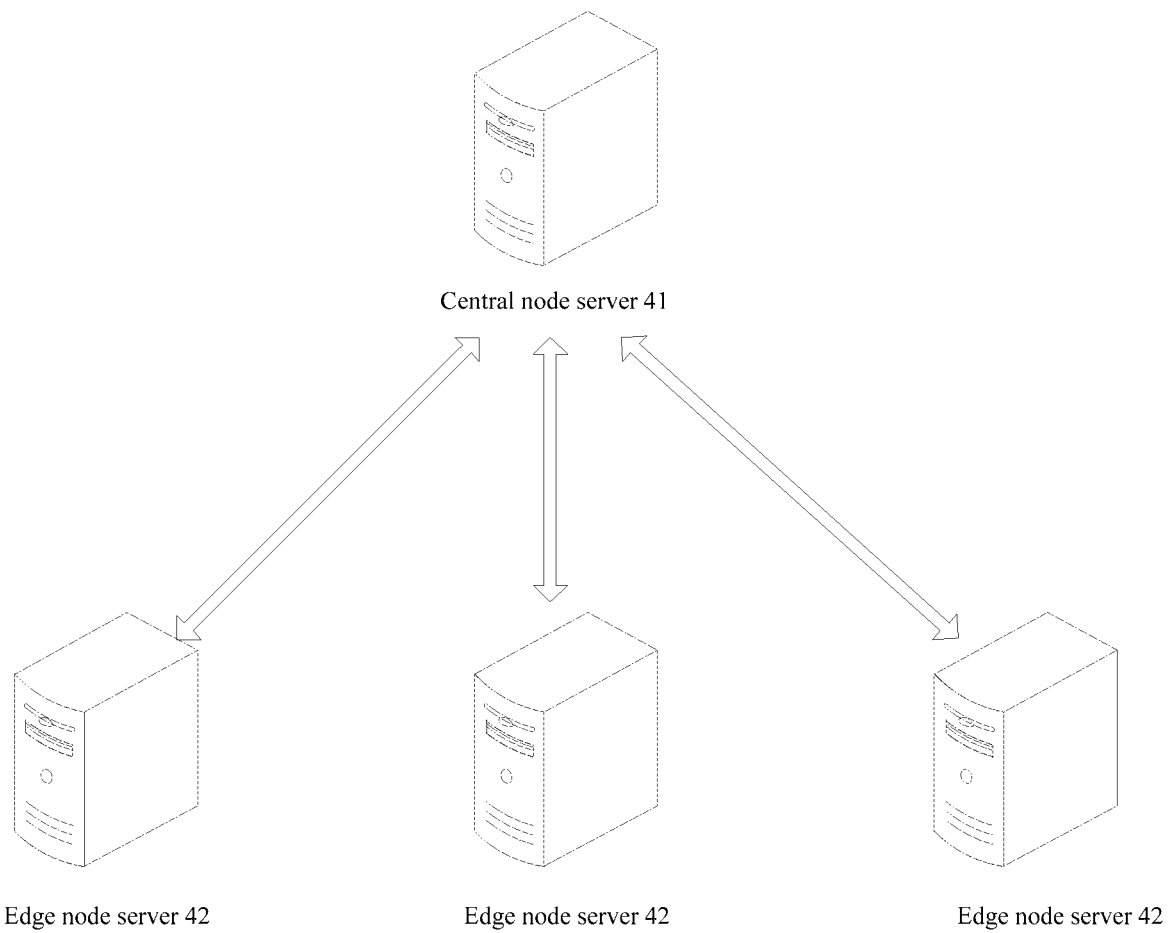
FIG. 4 is a schematic diagram illustrating a structure of a stream-pushing system according to an embodiment of the present disclosure.

An embodiment of the present disclosure further provides a stream-pushing system. As shown in FIG. 4, the stream-pushing system may include at least one central node server 41 (only one shown) and at least one edge node server 42.

The edge node server 42 may be configured to receive a stream-pushing request from a stream pusher, determine a target central node server based on the stream-pushing request and forward-push the stream-pushing request to the target central node server.

The central node server 41 may be configured to receive the stream-pushing request sent by the edge node server 42, and determine whether the stream-pushing request corresponds to an existing channel. When a determination result is yes, the central node server 41 may further be configured to send a prompt message to the edge node server 42; or, when the determination result is no, the central node server 41 may further be configured to establish one channel for the stream-pushing request and receive streaming media data corresponding to the channel.

In an example, when the edge node server 42 receives the prompt message from the central node server 42, the edge node server 42 may further be configured to send failure information of stream-pushing to the stream pusher.

Further, the edge node server 42 is further configured to disconnect with the stream pusher.

Further, the edge node server 42 is further configured to deny receiving the stream-pushing request corresponding to the channel based on a push prohibiting parameter. The push prohibiting parameter may be used to dispose the edge node server 42 so that the edge node server 42 is prohibited to receive the stream-pushing request corresponding to the channel in a particular period.

In an example, the stream-pushing request received by the central node server 41 may further include priority information. The central node server 41 may further be configured to compare the priority information of the stream-pushing request and the priority information of an existing channel when the determination result of determining whether the stream-pushing request corresponds to the existing channel is yes. The priority information may be indicated by a parameter, for example, Pri, in the URL of the stream-pushing request using the RTMP.

Further, the central node server 41 may further be configured to receive streaming media data with higher priority information based on a comparison result and store the priority information corresponding to the streaming media data.

In an example, when the priority of the stream-pushing request is lower than that of the existing channel, the central node server 41 may further send a prompt message indicating a lower priority to the edge node server 42. The prompt message indicating a lower priority may be a state code. The state code may be used to indicate an error type occurring to the current stream pushing.

Figure 5:
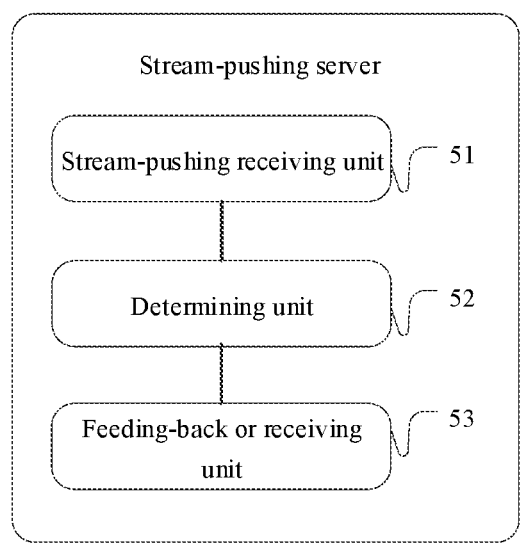
FIG. 5 is a modular diagram illustrating a stream-pushing server serving as a central node according to an embodiment of the present disclosure.

An embodiment of the present disclosure provides a stream-pushing server. The stream-pushing server may be a central node server. As shown in FIG. 5, the stream-pushing server may include:

a stream-pushing receiving unit 51, configured to receive a stream-pushing request forward-pushed by an edge node.

a determining unit 52, configured to determine whether the stream-pushing request corresponds to an existing channel.

a feeding-back or receiving unit, configured to send a prompt message to the edge node when the determination result is yes, or to establish one channel for the stream-pushing request and receive streaming media data corresponding to the channel when the determination result is no.

Figure 6:
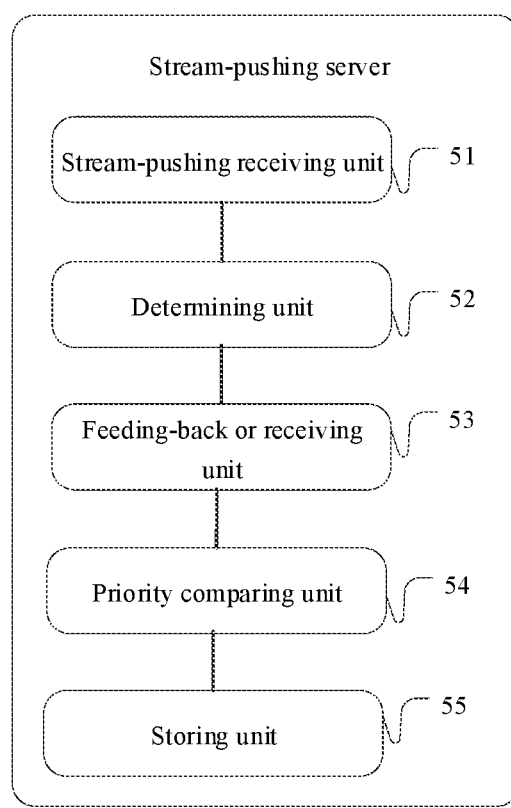
FIG. 6 is another modular diagram illustrating a stream-pushing server serving as a central node according to an embodiment of the present disclosure.

As shown in FIG. 6, in an example, the stream-pushing server may further include:

a priority comparing unit 54, configured to compare the priority information of the stream-pushing request and the priority information of an existing channel when the stream-pushing request includes priority information and the determination result of determining, by the central node server, whether the stream-pushing request corresponds to the existing channel is yes.

A storing unit 55, configured to receive streaming media data with higher priority information based on a comparison result of the priority comparing unit 54 and store the priority information corresponding to the streaming media data.

Figure 7:
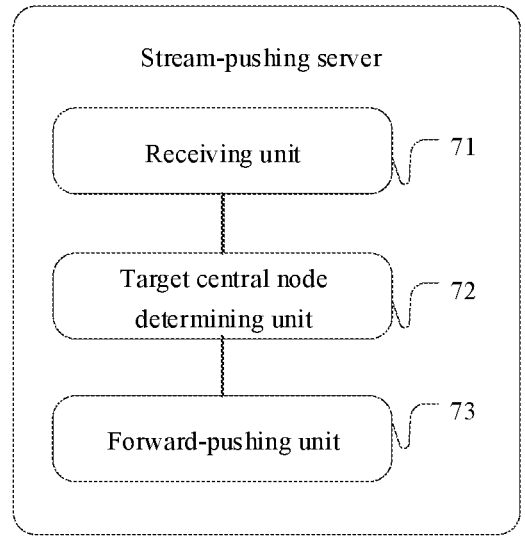
FIG. 7 is a modular diagram illustrating a stream-pushing server serving as an edge node according to an embodiment of the present disclosure.

An embodiment of the present disclosure further provides a stream-pushing server. The stream-pushing server may be an edge node server. As shown in FIG. 7, the stream-pushing server may include:

a receiving unit 71, configured to receive a stream-pushing request sent by a stream pusher.

A target central node determining unit 72, configured to determine a target central node based on the stream-pushing request so that the same stream-pushing request corresponds to the same target central node.

A forward-pushing unit 73, configured to forward-push the stream-pushing request to the target central node.

Figure 8:
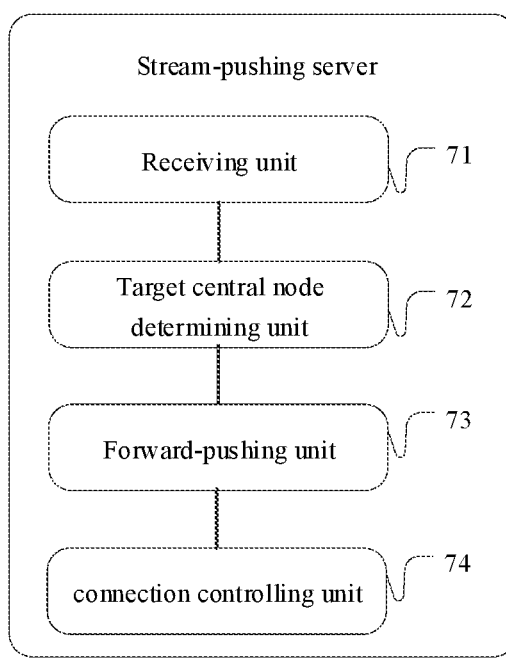
FIG. 8 is another modular diagram illustrating a stream-pushing server serving as an edge node according to an embodiment of the present disclosure.

As shown in FIG. 8, in an example, the stream-pushing server may further include a connection controlling unit 74, configured to disconnect with the stream pusher. Further, the connection controlling unit may also be used to deny receiving the stream-pushing request corresponding to the channel based on a push prohibiting parameter.

Figure 9:
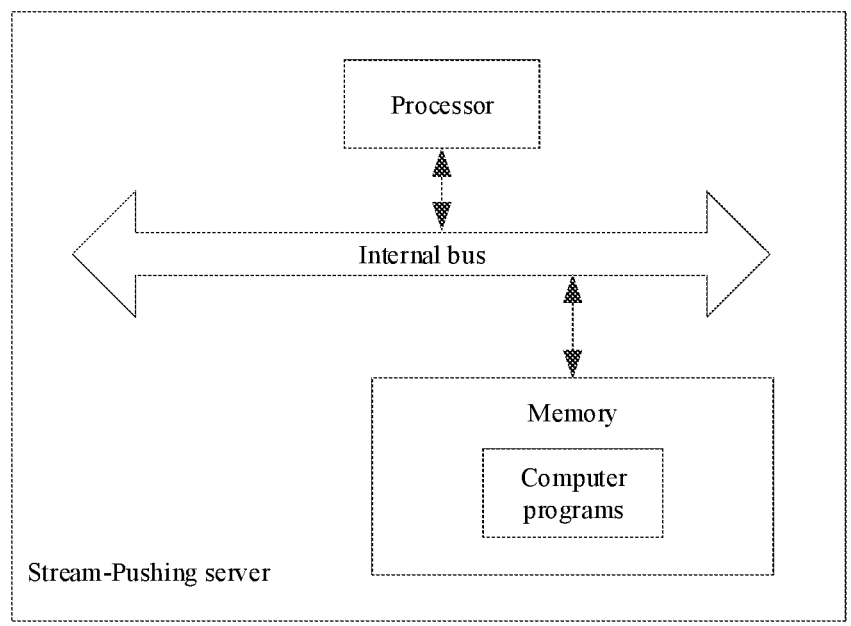
FIG. 9 is a schematic diagram illustrating a structure of a stream-pushing server according to an embodiment of the present disclosure.

As shown in FIG. 9, an embodiment of the present disclosure further provides a stream-pushing server. The stream-pushing server includes a memory and a processor. The memory is used to store computer programs. When the computer programs are executed by the processor, the stream-pushing method executed by the central node or the edge node as above may be implemented.

Figure 10:
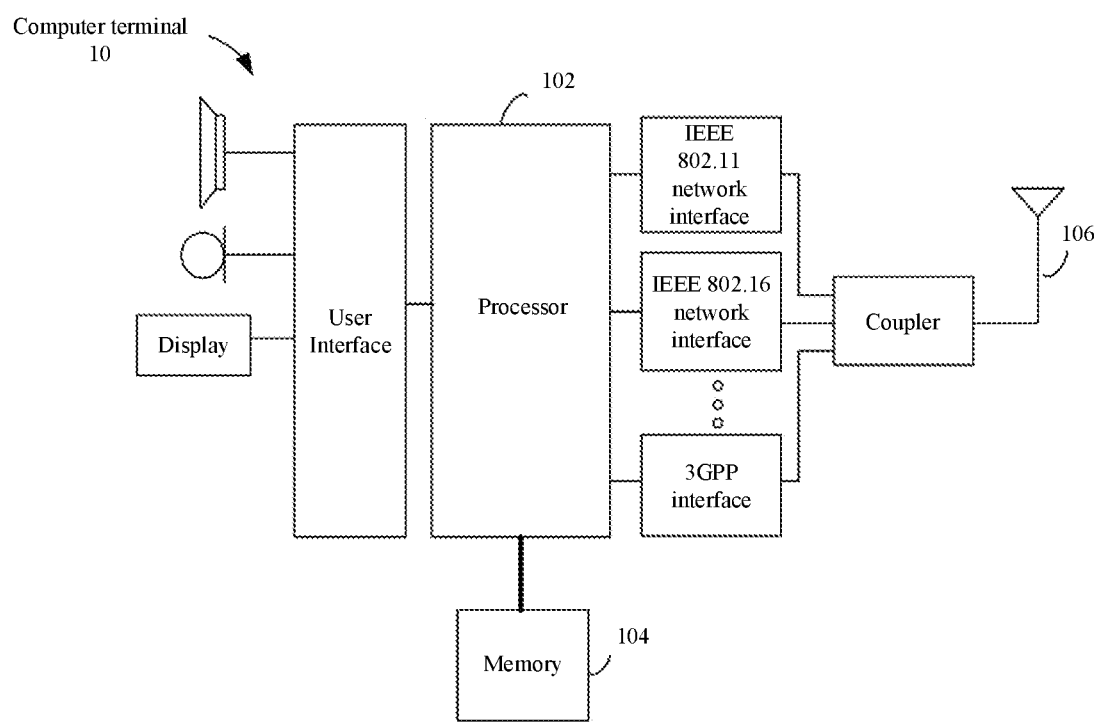
FIG. 10 is a schematic diagram illustrating a structure of a computer terminal according to an embodiment of the present disclosure.

As shown in FIG. 10, herein, the technical solutions in the above examples may be applied to a computer terminal 10 shown in FIG. 10. The computer terminal 10 may include one or more (only one shown in the figure) processors 102 (the processor 102 may include but not limited to processing devices such as microprocessor MCU and programmable logical device FPGA), a memory 104 for storing data, and a transmission module 106 for realizing communication functions. Those skilled in the art may understand that the structure shown in FIG. 10 is merely illustrative and does not constitute limitation to the structure of the above electronic device. For example, the computer terminal 10 may further include components less than or more than the components shown in FIG. 10, or have a configuration different from FIG. 10.

The memory 104 is used to store software programs or modules of an application software. The processor 102 may execute different functional applications and data processing by running the software programs or modules in the memory 104. The memory 104 may include a high speed random access memory and may also include a non-volatile memory, such as one or more magnetic storage device, a flash memory, or another non-volatile solid state memory. In some examples, the memory 104 may further include memories remotely set relative to the processor 102. The remote memories may connect to the computer terminal 10 through a network. The above network instances include but not limited to an internet, an intranet, a local area network, a mobile communication network and a combination thereof.

Specifically, herein, a deploying method of the above server may be serves as computer programs which are stored in the above memory 104. The memory 104 may be coupled with the processor 102. When the processor 102 executes the computer programs in the memory 104, different steps of the deploying method of the above server may be implemented.

A transmission module 106 is used to receive or transmit data via a network. The specific instances of the above network may include a wireless network provided by a communication provider of the computer terminal 10. In an example, the transmission module 106 may include a Network Interface Controller (NIC) which may communicate with the internet by connecting with a base station or other network devices. In an example, the transmission module 106 may be a Radio Frequency (RF) module which is used to communicate with the internet wirelessly.

As can be seen from the above, whether a stream-pushing request corresponds to an existing channel is determined by determining whether the channel names are consistent according to the technical solution of the present disclosure; when a corresponding channel exists, the stream-pushing request corresponding to the channel will not be received any more by feeding back a prompt message, thereby avoiding internal flow consumption and server resource wastes of a CDN. At the same time, it is guaranteed that the central nodes corresponding to the same channel name are consistent by determining the target central node to which forward-push is performed by the edge node based on a hash algorithm and the channel name. The same channel name may also be forward-pushed to the same central node through different edge nodes, thereby ensuring the uniqueness of one channel in an entire network. At the same time, load balance of the CDN can be achieved based on a hash operation, thereby improving stability and high availability of the CDN in different application scenarios such as a live broadcast. Thus, according to the technical solution provided by the present disclosure, the internal flow consumption and server resource wastes of the CDN may be avoided and the efficiency of stream-pushing may also be improved.

Further, contents that are processed or updated by a client may be pushed again with the same stream name based on the priority information and the stream data may overwrite the previous stream pushing, so that fast replacement and smooth connection of contents can be achieved, thereby meeting the scenario needs of clients and improving user experience.

According to the above descriptions of the examples, those skilled in the art may clearly understand that each example may be implemented by softwares and necessary general hardware platforms and may also be implemented by hardware. Based on this understanding, the technical solutions of the present disclosure essentially or a part contributing to the prior art may be embodied in the form of a software product, and the software product may be stored in a computer-readable storage medium, such as ROM/RAM, diskette, compact disk and so on, and include several instructions to enable a computer device (for example, a personal computer, a server, or a network device and so on) to implement the method described in each embodiment or part of the embodiment of the present disclosure.

The foregoing embodiment is merely illustrative of preferred examples of the present disclosure but not intended to limit the present disclosure, and any modifications, equivalent substitutions, adaptations thereof made within the spirit and principles of the disclosure shall be encompassed in the protection scope of the present disclosure.

What is claimed is:

1. A stream-pushing method for a live broadcast service using a content delivery network (CDN), the CDN comprising a central node, a plurality of edge nodes, and one or more stream pushers, the stream pushing method comprising, at the central node:
   receiving a stream-pushing request sent by a stream pusher of the one or more stream pushers and forwarded over the CDN via a respective edge node of the plurality of edge nodes, wherein the stream-pushing request is forwarded to the central node based on a channel name corresponding to the stream-pushing request and uniquely identifying a channel associated with the central node;
   determining whether the channel name of the stream-pushing request corresponds to an existing channel by comparing the channel name with all existing channels of the central node;
   sending a prompt message to the respective edge node in response to a determination that the channel name corresponds to an existing channel of the central node, wherein sending the prompt message indicates that the stream-pushing request is a repeated stream-pushing request received by the central node from another edge node of the plurality of edge nodes; and
   establishing a new channel for the stream-pushing request and receiving streaming media data from the stream pusher corresponding to the new channel in response to a determination that the channel name does not correspond to an existing channel of the central node.

2. The stream-pushing method according to claim 1, wherein determining whether the channel name of the stream-pushing request corresponds to an existing channel specifically comprises:
   comparing the channel name of the stream-pushing request with channel names of existing channels of the central node; and
   determining that the stream-pushing request corresponds to an existing channel in response to the channel name being among the channel names of the existing channels of the central node; and
   determining that the stream-pushing request does not correspond to an existing channel in response to the channel name not being among the channel names of the existing channels of the central node.

3. The stream-pushing method according to claim 2, wherein the channel name is used to uniquely identify a channel corresponding to the stream-pushing request, and the channel name comprises a publishing point and a stream name.

4. The stream-pushing method according to claim 1, wherein the stream-pushing request further comprises priority information.

5. The stream-pushing method according to claim 4, wherein, in response to a determination that the channel name of the stream-pushing request does not correspond to an existing channel, the method further comprises: storing priority information corresponding to the new channel.

6. The stream-pushing method according to claim 4, wherein, in response to a determination that the channel name of the stream-pushing request corresponds to an existing channel, the method further comprises:
   comparing the priority information of the stream-pushing request and priority information of the existing channel;
   receiving streaming media data with higher priority information based on the comparing; and
   storing the higher priority information corresponding to the streaming media data.

7. The stream-pushing method according to claim 1, wherein the prompt message is further configured to cause the respective edge node to send failure information to the stream pusher to deny receiving the repeated stream-pushing request.

8. The stream-pushing method according to claim 1, wherein the stream-pushing request forwarded over the CDN is transmitted based on a real time messaging protocol (RTMP), and a uniform resource locator (URL) using the RTMP includes a publishing point and a stream name.

9. A stream-pushing method for a live broadcast service using a content delivery network (CDN), the CDN including a target central node, a plurality of edge nodes, and one or more stream pushers, the stream-pushing method comprising, at a respective edge node of the plurality of edge nodes:

receiving, a stream-pushing request sent by a stream pusher of the one or more stream pushers;

determining a channel name corresponding to the stream-pushing request;

determining the target central node based at least on the channel name, wherein the channel name is used to uniquely identify a channel associated with the target central node;

forwarding the stream-pushing request to the target central node over the CDN, wherein the stream-pushing request causes the target central node to establish a new channel for receiving streaming media data from the stream pusher when the channel name does not correspond to an existing channel of the target central node; and.

10. The stream-pushing method according to claim 9, wherein determining the target central node according to the stream-pushing request, specifically comprises: determining an IP address of the target central/node from IP addresses of a plurality of central nodes by using the channel name as a key value on which a hash operation is performed.

11. The stream-pushing method according to claim 9, wherein the stream-pushing method further comprises: in response to receiving the prompt message from the target central node, sending failure information of stream-pushing to the stream pusher.

12. The stream-pushing method according to claim 9, further comprising: denying receiving the further stream-pushing requests corresponding to the existing channel based on a push prohibiting parameter.

13. The stream-pushing method according to claim 12, wherein the push prohibiting parameter comprises a push prohibiting channel name and a push prohibiting time.

14. The stream-pushing method according to claim 9, wherein the denying receiving further stream-pushing requests corresponding to the existing channel includes: disconnecting from the stream pusher.

15. A stream-pushing system, comprising at least one central node server, a plurality of edge node servers, and one or more stream pushers and being configured for a live broadcast service using a content delivery network (CDN), wherein, a respective edge node server of the plurality of edge node servers is configured to:

receive a stream-pushing request sent by a stream pusher of the one or more stream pushers;

determining a channel name determining a target central node server based at least on the channel name, wherein the channel name is used to uniquely identify a channel associated with the target central node server; and forward the stream-pushing request to the target central node server over the CDN;

wherein the target central node server is one of the at least one central node server; and the target central node server is configured to:

receive the stream-pushing request forwarded by the respective edge node server, and determine whether the channel name corresponding to the stream-pushing request corresponds to an existing channel by comparing the channel name with all existing channels of the tar et central node server;

send a prompt message to the respective edge node server in response to a determination that the channel name corresponds to an existing channel of the target central node server, the prompt message indicating that the stream-pushing request is a repeated stream-pushing request received by the target central node server from another edge node server of the plurality of edge node servers; and establish a new channel for the stream pushing request and receive streaming media data from the stream pusher corresponding to the new channel in response to a determination that the channel name does not correspond to an existing channel of the target central node server.

16. The stream-pushing system according to claim 15, wherein an edge node server having received the prompt message from the target central node server is further configured to: deny receiving the repeated stream-pushing request based on a push prohibiting parameter.

17. The stream-pushing system according to claim 15, wherein the target central node server is further configured to, when the stream-pushing request comprises priority information and in response to the determination that the channel name corresponds to the existing channel, compare the priority information of the stream-pushing request and priority information of the existing channel, receive streaming media data with higher priority information based on the comparing and store the higher priority information corresponding to the streaming media data.

* * * * *